March 1, 1949.    J. D. AKERMAN    2,463,346
TRANSPORT AIRPLANE WITH INTERCHANGEABLE
CARGO HOLDING UNIT
Filed Nov. 3, 1943    2 Sheets-Sheet 1

Inventor
John D. Akerman
By Williamson & Williamson
Attorneys

March 1, 1949.  J. D. AKERMAN  2,463,346
TRANSPORT AIRPLANE WITH INTERCHANGEABLE
CARGO HOLDING UNIT
Filed Nov. 3, 1943  2 Sheets-Sheet 2
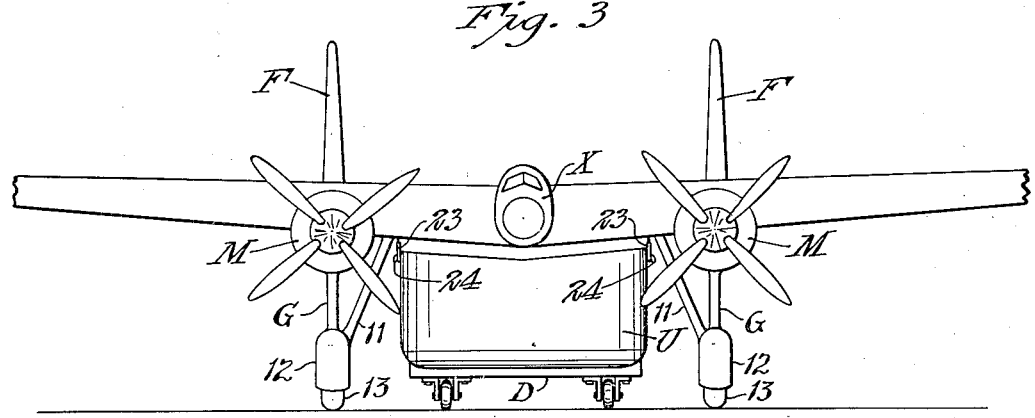
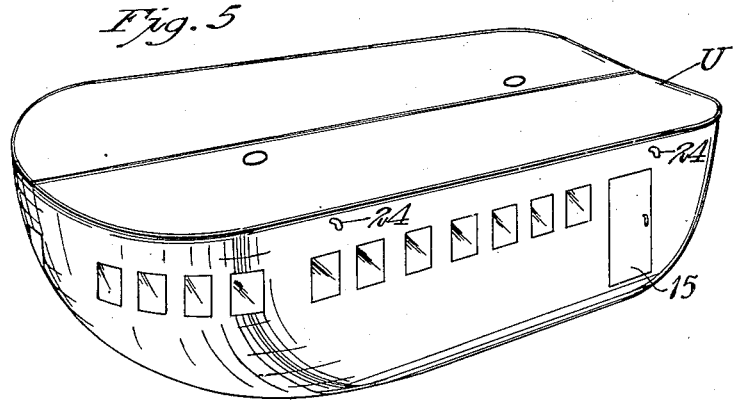
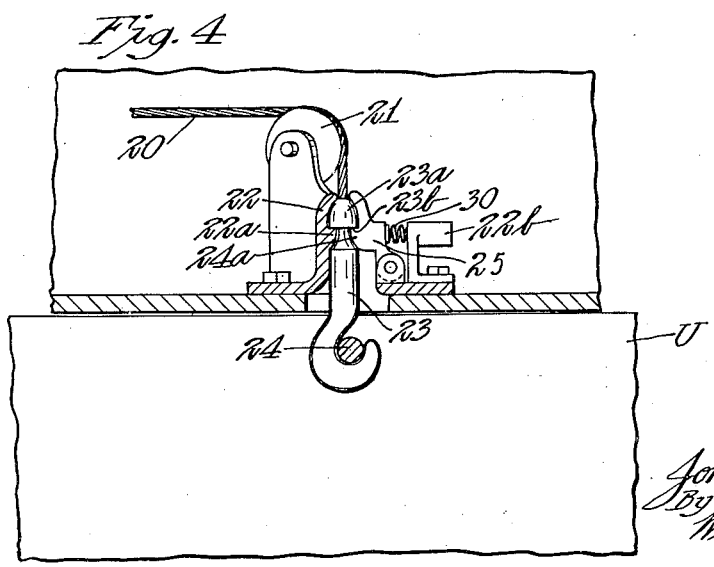
Inventor
John D. Akerman
By Williamson & Williamson
Attorneys Patented Mar. 1, 1949

2,463,346

UNITED STATES PATENT OFFICE 2,463,346

TRANSPORT AIRPLANE WITH INTERCHANGEABLE CARGO HOLDING UNITS

John D. Akerman, Minneapolis, Minn.

Application November 3, 1943, Serial No. 508,782

3 Claims. (Cl. 244—118)

This invention relates to aerial transportation and particularly to a carrier airplane cooperatively associated with a plurality of interchangeable cargo units or load holders which may be selectively and detachably suspended below the fuselage and wings of the plane for flight without interference of fuselage or tail planes.

At the present time loading and unloading of freight, equipment, passengers and baggage, at the various terminals and landing fields and at bases in war zones, requires considerable time and labor and the planes used for transport are, of course, idle during such time.

It is an object of my present invention to provide a comparatively simple, thoroughly practical and efficient transport airplane construction wherein the cargo, whether passengers or freight, is suspended and detachably coupled beneath the wings of the plane and is readily uncoupled therefrom immediately upon landing, whereby the carrier plane may very quickly pick up another pre-loaded cargo unit and immediately take off for further transport duty.

More specifically it is an object to provide a cargo-carrying airplane construction having wing, fuselage, body assembly and landing gear construction of relatively light weight in relation to its power and having provision in its landing supports, tail planes and design for reception of and fast coupling with interchangeable cargo-holding units, the latter preferably being in the form of a stream-lined housing, constructed to various specific requirements for carrying freight or passengers.

A further object is the provision of a strong but lightly built carrier plane assembly utilizing only a minimum of space and weight for the housing of the pilots and crew and having incorporated in its design, supporting and coupling means for quick attachment of an interchangeable cargo holder positioned just beneath the fuselage.

A further object is the provision of a cargo plane of the type described wherein efficient provision is made for the elevating of a stream-lined cargo holder or housing from below the wings of the plane and for coupling and firmly securing such cargo holder or housing substantially flush against the fuselage and wings and between the forward elements or legs of specially constructed landing gear, and wherein the plane is specially constructed with high tail effect to enable it to taxi over a cargo housing.

Another object is the provision of a transport plane with interchangeable cargo units wherein the main assembly and landing supports of the plane proper are constructed to enable a pre-loaded cargo unit or holder to be drawn up to and under the plane, on a landing field or terminal and thereafter quickly elevated and coupled to the underside of the fuselage in balanced relation with the body and wings to facilitate efficient and fast travel of the plane.

A still further object, is to provide a transport plane of the class described wherein the reinforced and stronger portions of the plane skeleton or body are utilized in conjunction with novel landing gear and coupling mechanism to distribute and sustain the weight of a suspended interchangeable cargo-containing housing to best advantage for balance, effective flying and lightness of general construction.

These and other objects and advantages will be more apparent from the following description made in connection with the accompanying drawings, wherein like reference characters refer to the same parts throughout the several views, and in which—

Figure 3 is a front elevation of the same plane, showing one of my stream-lined cargo housings, pre-loaded and drawn up to coupling position below the fuselage and wings of the plane in position to be elevated and fixedly coupled thereto;

Figure 4 is a detail vertical section along the line 4—4 of Figure 2, showing a satisfactory coupling and locking mechanism which may be utilized in combination with load elevating means to successfully elevate, secure and support the load; and Figure 5 is a perspective view of a stream-lined cargo housing designed for passengers.

Figure 2:
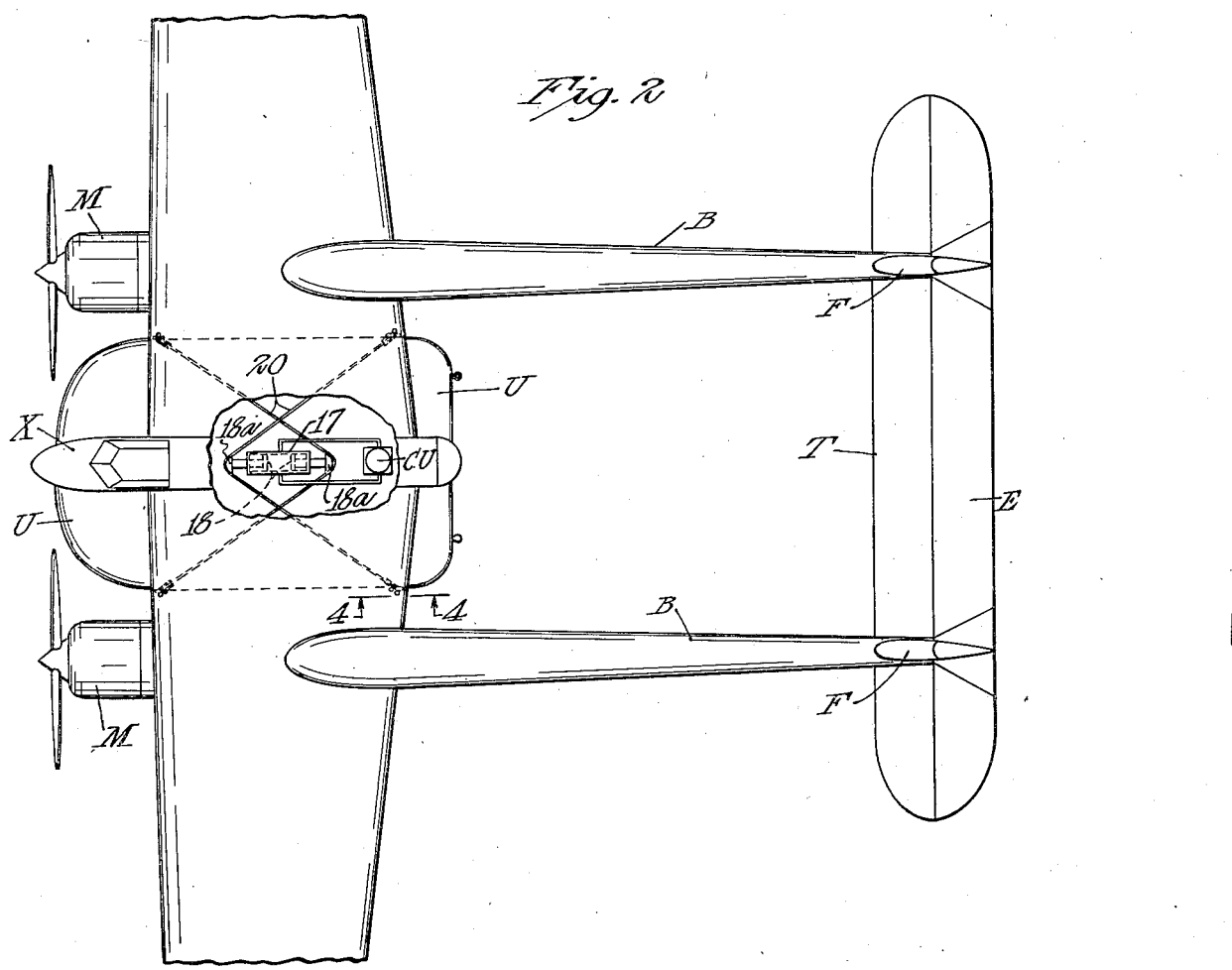
Figure 2 is a plan view of the same, some parts of the fuselage being broken away to show portions of a satisfactory form of elevating and coupling device and also having the wing tips broken.
Figure 1:
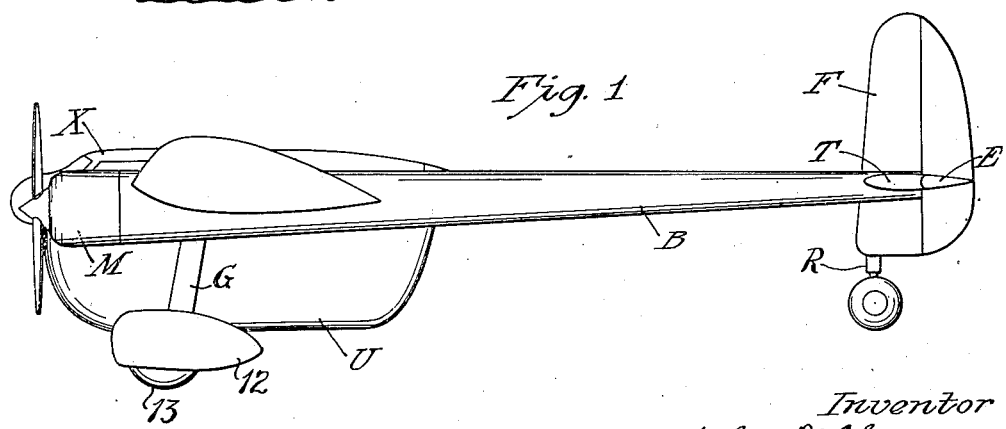
Figure 1 is a side view, in perspective, of an embodiment of my invention, having a freight-holding cargo unit coupled thereto and in readiness for flight.

It will, of course, be understood that various general types and designs of airplanes suitable for transport duty may be utilized all within the scope of my invention. The general design and type of plane shown is merely exemplary, but lends itself well for combination with the interchangeable cargo holders or units of my invention.

The airplane is preferably, but not necessarily, of the single wing design, with a pod type fuselage X of very light and compact construction, this fuselage interior being arranged to provide for the housing of the pilot and co-pilot at its forward end and for the housing of the remainder of the crew such as a navigator, radio operator and/or mechanic, as the need may be, aft of the pilot compartment. The under longitudinal surface of the fuselage, preferably merges into the contour of the central under air foil surface of the wing. As shown, the plane is provided with elongated, twin tail booms B tapering from the wing to a single relatively wide horizontal tail T. Tail T has attached thereto an integral elevator E and also serves to reinforce and stabilize the entire construction. Two vertical fins F properly stream-lined, are employed, extending perpendicularly to tail T and each aligned with one of the tail booms B. Said fins are both provided with the usual swingable rudders and are further utilized as housings for the rear landing gear elements R which extend therethrough to the booms B. Elements R are relatively high to position the rear of the plane a considerable distance above the landing surface for load clearance. It will be also noted that the two rear landing gear elements are spaced very widely apart to clear or pass over a load or cargo holding unit.

In the plane illustrated two engines are utilized, axially aligned with the booms B and positioned just forwardly of the leading edge of the wing. Efficient, but comparatively light truss and reinforcing structure, not shown in detail, is employed between the booms, fuselage and within the wings.

A pair of very widely spaced forward landing gear elements or struts G are secured respectively to the underside and forward portions of booms B, suitably braced by diagonal brace beams 11 and preferably being stream-lined throughout and having stream-lined housings 12 for the large, tired, landing wheels 13. The forward landing gear elements G are relatively tall and preferably of such height as to tilt the forward end of the plane slightly upwardly relative to the tail thereof and to provide for high clearance directly below the fuselage and central portion of the wing.

It will be seen that my carrier plane is capable of very wide variations in general design, has a wing fuselage and boom assembly (where booms are used) which merges at its lower side into a general concave surface (viewed from the front of the plane) not varying considerably from a horizontal plane, and which surface is disposed with high clearance above the landing support when the plane is grounded. It will further be seen that a design must be preferably such that a very high tail plane effect is secured with the landing gear of the tail elongated and the supporting elements thereof being disposed widely apart for clearance of the loads to be picked up and to enable taxiing of the plane thereover.

Detachably combined and associated with the carrier plane described, are provided a plurality of specially constructed and selectively utilizable cargo units or holders, indicated as entireties by the letter U. These may be designed for various specific purposes in carrying freight, equipment or passengers, and preferably are constructed of a width and height to clear and be moved by wheeled support under the carrier plane between the widely spaced landing gear and tail wheel elements, into position just below the central underside of the wing surface and belly of the fuselage. They are preferably, but not necessarily, constructed in the shape of stream-lined housings of somewhat less width than the space between the two forward struts G and may be of a length materially greater than the maximum width of the wing at its central portion. These housings may be provided with supporting wheels (not shown) for movement over a landing surface but preferably are stream-lined along all surfaces having a smooth under-surface which may rest upon and be supported by a low wheeled truck or dolly D as shown in Figure 3. The housing or cargo units U preferably have their tops covered and contoured to closely fit the under contour of the central portion of the wing with the fuselage merged therein. Side or end doors 15 may be provided for facilitating loading of the housings and the top may also be detachable, if desired. The design of the housing of course can be varied within wide limits, depending upon the specific use to which it is put. As shown in Figure 5, a passenger carrying housing unit U is provided having a rear door and having windows on the sides and front thereof and provided within with passenger seats, storage compartments for baggage and other facilities, as required.

Efficient coupling means are provided for quickly securing the interchangeable cargo holders or units U to the underside of the fuselage and wing. I prefer to combine with said coupling means, elevating mechanism for lifting the preloaded housing U upwardly against the underside of the wing and fuselage as well as for securing the unit in underslung position for flight, although it will, of course, be understood that elevating means independent of the plane, such as jacks mounted upon the dolly D may be substituted for my elevating means now to be described.

As shown hydraulically operated lifting mechanism is horizontally and longitudinally disposed within the center of the wing and at the bottom of the fuselage, properly supported upon a trussed or braced mounting, and as shown comprising a double hydraulic cylinder 17, having mounted therein a pair of outwardly moving plungers 18, which carry at their outer ends external heads 18a to each of which a pair of lifting cables 20 is connected. The rearwardly moving piston 18 has connected thereto the forwardly diverging pair of lifting cables 20, the forward ends of which are trained over vertical pulleys 21 pivotally mounted upon suitable coupling castings 22 which are supported upon heavily braced means disposed just inwardly of the respective booms B and adjacent the leading edge of the wing. The cables 20 pass downwardly from the pulleys through a hook-receiving socket and have heavy coupling hooks 23 attached to their outer ends. Coupling hooks 23 are adapted to surround very heavy attachment eyes or brackets 24 provided in the top or sides of the housing units. The coupling hooks 23 are further provided with nosed heads 23a each having a locking shoulder 23b therebelow defined by an annular groove in the shank of the hook. The said locking shoulders are adapted to be positively engaged by and locked with cooperating semi-annular locking ribs 22a and 24a provided by the casting 22 and a spring actuated dog 25, respectively. Dog 25, as shown, is connected at its lower end to the right hand base portion of coupling casting 22, the pivotal axis being disposed outwardly of the surface of engagement of the locking rib 24a with the locking shoulder 23b of the hook head. (See Figure 4.) The dog 25 is urged into engagement with the locking head 23a by suitable means such as a strong coil spring 30 interposed between an abutment socket 22b and a projecting stud at the rear of the locking head of the dog. The dog 25 has a locking or engagement head shaped as shown in Figure 4 provided with the semi-annular locking rib 24a previously described. It will, of course, be understood that any suitable power source other than hydraulic mechanism such as electric motors, or manually operated winches, can be utilized in place of the hydraulically operated mechanism for elevating.

The elevating cables and coupling mechanism controlled by the rearward movement of the rear piston 18 has been described. The forward piston 18 of the hydraulic mechanism has secured to its external head 18a, the rearwardly diverging pair of lifting cables 20 which extend rearwardly and outwardly to points just above the rear edge of the wing adjacent to the respective tail booms B and said cables 20 are trained about rear pulleys 21 associated with mountings 22 and coupling and locking mechanism of the identical structure described with reference to the forwardly disposed coupling mechanism. The hydraulic cylinder is provided with a compressor unit CU and with suitable conduits or connections therefrom to cause fluid to be applied centrally of cylinder 17 between the two hydraulic pistons and selectively at points adjacent the ends of the cylinder for retraction of the pistons.

Although the design and structure of my coupling means and its connecting elements on the cargo unit may be, of course, widely varied, for sake of illustration I have shown on the sides of the housing units, pairs of very heavy attachment eyes or pins for connection with the hooks 23. These eyes may be on the exterior of the housing sides, or may be in pockets formed and reinforcibly connected at the top thereof.

It will be noted by reference to Figure 5 that a pair of oval shaped apertures are provided in the top of the cargo unit U through which may extend connections and conduits from the carrier plane for transmission of electricity or for connection with air conditioning or heating units mounted in the plane, such connections or conduits being of a type which may be readily coupled with connection conduits or devices mounted within the cargo housing U.

With my improved structure one of the cargo units or holders U may be pre-loaded with passengers or baggage, or with freight or equipment at a terminal or base before the carrier plane arrives, positioned in readiness for coupling to the plane. The carrier plane may then land on the field, uncouple its load and taxi over the cargo unit U or position itself for take-off whereafter the cargo unit is moved under the plane between the widely spaced landing gear and tail wheel elements and directly below the fuselage and central portion of the lower side of the wing. Thereupon, only a very short time is required to connect the coupling hooks 23 from the plane with the attachment members 24 of the cargo housing; operate the hydraulic lifting mechanism to raise the units U in compact substantially flush underslung position below the wing and in so doing automatically lock through engagement of the locking ribs 22a and 24a respectively, the coupling shanks in fixed load-carrying relation. The plane may then take off with its load slung thereunder below the center of the wing and directly beneath the light fuselage.

The construction of the carrier plane and its landing gear and wing and fuselage portions permits housing units of relatively wide width to be accommodated and underslung. The combination of the parts is such that the loaded units with the carrier plane are properly balanced for efficiency, speed and safety in flight and in landing. The construction of the plane assembly, particularly the high tail effect and widely spaced landing gear elements, enables the stream-lined cargo units of large capacity to be accommodated and taxied over on the landing field.

While the form of invention illustrated is particularly applicable to the handling primarily of large cargos of freight and passengers, it will be seen that my type of carrier airplane and cargo unit is as readily adapted for a large number of uses on a smaller scale, for example, the fast transportation of smaller cargos on feeder lines, express shipments of perishable goods, or live stock, or even the transportation of house trailers from one camp site to another.

It will, of course, be understood that shape, length, size and construction of my cargo holders or lead units may be varied materially all within the scope of the invention and need not be in the form of stream-lined housing or casing, but may be of skeleton or other type for the particular duties required.

From the foregoing it will be seen that a large amount of time and labor is saved in the loading and unloading of cargo at the various freight and passenger terminals, airports and war bases. My invention further enables equipment of various shapes and dimensions not suitable for disposal in standard transport planes, to be quickly picked up and transported.

While my invention is particularly applicable as illustrated to carrier airplanes, including rocket ships, it is also well adapted for the various other types of airships suitable for transport purposes, such as helicopters, dirigibles and other vehicles of air transportion having bodies or a fuselage which may be designed for support of an underslung cargo holding unit.

It will, of course, be understood that various changes may be made in the form, details, proportions and arrangements of the parts without departing from the scope of my invention.

What I claim is:

1. A transport aircraft including a sustaining wing, a fuselage secured thereto, and a tail assembly including spaced rudders and an elevator extending therebetween, means extending from said wing for supporting said tail assembly, said wing having a continuous substantially smooth under contour, an interchangeable cargo holder comprising a shell-like body provided with longitudinally spaced pairs of support receiving members on opposite sides thereof adjacent the upper edges, the upper surface of said body being substantially closed and having a contour in substantial conformity with the under contour of said wing and adapted to merge therewith, landing gear elements depending from the under surface of said wing in widely spaced relation so that the cargo holder can fit therebetween and be straddled thereby, landing gear elements depending from said tail assembly in widely spaced relation and in substantial longitudinal alignment with the first mentioned landing gear elements depending from said wing, the said landing gear elements spacing the undersurfaces of the wing and the under surface of the elevator a distance from the ground greater than the height of said cargo holder, the undersurface of said wing having spaced pairs of longitudinally aligned apertures therein, said apertures being horizontally spaced apart a distance substantially the width of the said cargo holder and longitudinally spaced apart a distance substantially the distance between the longitudinally spaced pairs of support receiving elements on the body of said cargo holder, elevating means housed within said wing and including longitudinally spaced pairs of flexible lift force transmitting elements passing through the apertures in said wing, a lifting member fixedly mounted on the outer end of each of said lift force transmitting elements including an outer hook portion and an inner locking shoulder, the said hook portion being engageable with the support receiving elements on the body of the cargo holder so that the same may be elevated thereby into a position beneath and flush against the under surface of said wing, and spring projected locking means mounted within the wing adjacent the apertures therein for automatically engaging the locking shoulder on the inner end of each hook as the same are elevated within the wing to automatically lock all of said hooks and the cargo holder suspended therefrom when the latter is flush against the under surface of the said wing.

2. A transport aircraft including a sustaining wing, a fuselage secured thereto, a tail assembly and means extending from said wing for supporting said tail assembly, pairs of landing gear elements depending from the under surface of said wing and from said tail assembly in widely spaced horizontal relation, an interchangeable cargo holder comprising a shell-like body having parallel opposite sides and a substantially closed and smooth upper surface and longitudinally spaced pairs of support receiving members mounted adjacent the upper edges of said opposite sides, the upper contour of said cargo holder being in substantial conformity with the under contour of said wing, the said landing gear elements being spaced apart distances greater than the width of said cargo holder and spacing the said wing and tail assemblies a distance above the ground greater than the height of said cargo holder when the plane is resting or taxiing along the ground so that the same may straddle said cargo holder, elevating means disposed within the wing including fluid operated mechanism comprising a cylinder disposed longitudinally of the wing, opposed pistons disposed within said cylinder and conduits for the supply and exhaust of fluid communicating with said cylinder between the inner ends of said pistons and means for circulating fluid through said conduits to simultaneously move the pistons outwardly in said cylinder, a pair of flexible lift force transmitting elements trained over the outer ends of each of said pistons and movable thereby, supporting members carried by the outer ends of each of said lift force transmitting elements, said supporting members being disposed in longitudinally spaced pairs of members and passing through apertures in the under surface of said wing adjacent the trailing and leading edges thereof, the said pairs of supporting members being horizontally spaced a distance substantially the width of said cargo holder and longitudinally spaced substantially the distance between the pairs of said support receiving elements on the body of said cargo holder, the said supporting members being engageable with the said support receiving elements on said cargo holder for elevating the same, the lift force transmitting element trained over the piston movable outwardly toward the front of said aircraft moving the supporting members disposed adjacent the trailing edge of said wing and the lift force transmitting element trained over the piston moving outwardly of said cylinder toward the tail of said aircraft moving the supporting members disposed adjacent the leading edge of said wing when fluid is admitted into said cylinder between the inner ends of said pistons to elevate said cargo holder, said supporting members including an outer hook portion and an inner locking shoulder portion, and locking shoulder receiving members including a spring projected member disposed within the wing adjacent each aperture therethrough, the said spring projected member automatically engaging the locking shoulder on each of said supporting members when the same have elevated the said cargo holder flush against the under surface of said wing to effectively lock said cargo holder in position.

3. A transport aircraft of the character described, including an interchangeable cargo holder to be carried thereby and including a sustaining wing having a substantially smooth under contour, the upper contour of said cargo holder being in substantial conformity therewith, landing gear elements depending from the under surface of said wing in widely spaced relationship, the distance therebetween being greater than the width of said cargo holder and said landing gear elements spacing said wing a distance above the ground greater than the height of said cargo holder, support receiving members disposed in longitudinally spaced pairs on the opposite sides of said cargo holder adjacent the upper edges thereof, elevating means disposed centrally within the wing and including a cylinder disposed longitudinally of said wing and centrally thereof, opposed pistons movable outwardly from said cylinder, fluid supply and exhaust conduits communicating with said cylinder between the inner ends of said pistons, means for circulating fluid through said conduits for controlling the outward movement of said pistons, heads carried by the respective outer ends of said pistons, a pair of lift force transmitting elements secured to and passing over the respective heads on said pistons, the outer ends of each of said lift force transmitting elements having supporting members secured thereto which supporting members pass through apertures in the under surface of said wing adjacent the trailing and leading edges thereof, the outer ends of the lift force transmitting elements which pass through the apertures in the trailing edge of the wing being movable by the forwardly moving piston in said cylinder and the outer ends of the lift force transmitting element which pass through the apertures adjacent the leading edge of said wing, being movable by the rearwardly moving piston in said cylinder, said supporting members being detachably engageable with said support receiving members on said cargo holder for elevating the same to a position flush against the under surface of said wing, and automatic locking means disposed within said wing adjacent each aperture therein for automatically engaging and locking said supporting members when the upper surface of said cargo holder has abutted the under surface of said wing to securely and effectively clamp said cargo holder in position beneath said wing.

JOHN D. AKERMAN.

REFERENCES CITED

The following references are of record in the file of this patent:

UNITED STATES PATENTS

| Number | Name | Date |
|---|---|---|
| 1,797,326 | Christmas | Mar. 24, 1931 |
| 1,797,713 | Brogelli | Mar. 24, 1931 |
| 2,075,042 | Knerr | Mar. 30, 1937 |
| 2,215,003 | Johnson | Sept. 17, 1940 |
| 2,224,641 | Burnelli | Dec. 10, 1940 |
| 2,310,887 | Andersen | Feb. 9, 1943 |
| 2,367,538 | Sullivan | Jan. 16, 1945 |